(12) United States Patent
Makovsky et al.

(10) Patent No.: US 10,979,296 B2
(45) Date of Patent: Apr. 13, 2021

(54) SYSTEMS AND METHOD FOR SERVICE MAPPING

(71) Applicant: ServiceNow, Inc., Santa Clara, CA (US)

(72) Inventors: Bnayahu Makovsky, Savyon (IL); Ofer Gati, Netanya (IL); Netta Hasdai, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 316 days.

(21) Appl. No.: 15/814,155

(22) Filed: Nov. 15, 2017

(65) Prior Publication Data
US 2019/0104019 A1    Apr. 4, 2019

Related U.S. Application Data

(60) Provisional application No. 62/568,087, filed on Oct. 4, 2017.

(51) Int. Cl.
*H04L 12/24* (2006.01)
*G06F 8/34* (2018.01)
(Continued)

(52) U.S. Cl.
CPC ............ *H04L 41/0853* (2013.01); *G06F 8/34* (2013.01); *G06F 9/50* (2013.01); *G06F 11/0766* (2013.01); *G06F 11/0793* (2013.01); *H04L 41/065* (2013.01); *H04L 41/0618* (2013.01); *H04L 41/22* (2013.01); *H04L 41/5012* (2013.01);
(Continued)

(58) Field of Classification Search
CPC . H04L 41/00–5096; H04L 41/06–0695; H04L 41/08–0896; G06F 8/34; G06F 11/0766–0793
See application file for complete search history.

(56) References Cited

U.S. PATENT DOCUMENTS 5,761,429 A * 6/1998 Thompson .......... H04L 41/0233
709/224
5,786,770 A * 7/1998 Thompson ........... H04B 7/2628
709/230
(Continued)

OTHER PUBLICATIONS

Extended European Search Report for European Application No. 18198392.5 dated Jan. 7, 2019; 9 pgs.

*Primary Examiner* — Emmanuel L Moise
*Assistant Examiner* — Julian Chang
(74) *Attorney, Agent, or Firm* — Fletcher Yoder PC

(57) ABSTRACT

A system includes a non-transitory memory and one or more hardware processors. The one or more hardware processors are configured to read instructions from the non-transitory memory to perform operations including generating a service mapping illustrating a plurality of tiles, wherein each of the plurality of tiles corresponds to one or more services in an enterprise network and one or more lines extending between the plurality of tiles, wherein the one or more lines correspond to connections between the plurality of services, wherein a first tile of the plurality of tiles corresponds to a first service comprising a plurality of sub-services not depicted in the service mapping, and displaying an alert on the first tile corresponding to the first service when one or more of the plurality of sub-services encounters an error.

19 Claims, 10 Drawing Sheets

(51) Int. Cl.
  *G06F 11/07* (2006.01)
  *G06F 9/50* (2006.01)
  *G06Q 10/06* (2012.01)
  *H04L 29/08* (2006.01)

(52) U.S. Cl.
  CPC ..... *H04L 41/5058* (2013.01); *G06Q 10/0631* (2013.01); *H04L 67/16* (2013.01)

(56) References Cited

U.S. PATENT DOCUMENTS

| | | | |
|---|---|---|---|
| 5,838,913 A * | 11/1998 | Lysejko | H04B 1/7075 709/208 |
| 5,999,179 A * | 12/1999 | Kekic | H04L 41/0213 715/734 |
| 6,175,560 B1 * | 1/2001 | Bhagalia | H04B 1/707 370/320 |
| 6,185,197 B1 * | 2/2001 | Cheung Yeung | H04B 1/707 370/328 |
| 6,321,229 B1 | 11/2001 | Goldman | |
| 6,609,122 B1 | 8/2003 | Ensor | |
| 6,678,887 B1 | 1/2004 | Hallman | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,493,400 B2 | 2/2009 | Loaiza et al. | |
| 7,610,512 B2 | 10/2009 | Gerber | |
| 7,614,012 B1 * | 11/2009 | Dulaney | G06F 3/04817 715/716 |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 9,015,188 B2 | 4/2015 | Behne | |
| 9,037,536 B2 | 4/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,412,084 B2 | 9/2016 | Kowalski | |
| 9,467,344 B2 | 10/2016 | Gere | |
| 9,535,737 B2 | 1/2017 | Joy | |
| 9,557,969 B2 | 1/2017 | Sharma | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | Hutchins | |
| 9,736,025 B2 | 8/2017 | Weavind et al. | |
| 9,766,935 B2 | 9/2017 | Kelkar | |
| 9,792,387 B2 | 10/2017 | George | |
| 9,805,322 B2 | 10/2017 | Kelkar | |
| 9,819,729 B2 | 11/2017 | Moon | |
| 9,852,165 B2 | 12/2017 | Morozov | |
| 9,948,384 B1 * | 4/2018 | Morara | H04B 10/0791 |
| 10,002,203 B2 | 6/2018 | George | |
| 2003/0018822 A1 * | 1/2003 | Robb | H04L 41/0226 709/250 |
| 2003/0069869 A1 * | 4/2003 | Gronau | G06Q 10/06 706/46 |
| 2003/0070108 A1 * | 4/2003 | Groen | G06F 11/008 714/1 |
| 2004/0046785 A1 * | 3/2004 | Keller | G06F 9/5061 715/734 |
| 2004/0049509 A1 * | 3/2004 | Keller | G06Q 10/00 |
| 2004/0250260 A1 * | 12/2004 | Pioso | G06F 11/0709 719/316 |
| 2005/0091347 A1 * | 4/2005 | Schmitt | G06F 8/20 709/220 |
| 2005/0181835 A1 * | 8/2005 | Lau | H04L 41/042 455/567 |
| 2005/0283675 A1 * | 12/2005 | Krebs | G06F 9/453 714/38.1 |
| 2006/0069459 A1 * | 3/2006 | Retlich | G05B 23/0216 700/108 |
| 2006/0070010 A1 * | 3/2006 | Retlich | G06F 9/451 715/798 |
| 2007/0100930 A1 * | 5/2007 | Moon | H04L 41/5035 709/200 |
| 2007/0177982 A1 * | 8/2007 | Cadet | F04B 49/08 417/19 |
| 2007/0251998 A1 * | 11/2007 | Belenki | G06N 3/126 235/380 |
| 2008/0313006 A1 * | 12/2008 | Witter | G06Q 10/063118 705/7.17 |
| 2009/0279551 A1 * | 11/2009 | Wong | H04L 12/4641 370/395.53 |
| 2010/0043074 A1 * | 2/2010 | Scates | G06Q 10/0637 726/25 |
| 2010/0325412 A1 * | 12/2010 | Norrman | G06F 21/577 713/100 |
| 2011/0071987 A1 * | 3/2011 | Davis | G06F 16/166 707/687 |
| 2012/0016973 A1 * | 1/2012 | Haris | H04L 49/00 709/220 |
| 2012/0089523 A1 * | 4/2012 | Hurri | G06Q 10/10 705/304 |
| 2012/0154171 A1 * | 6/2012 | Hurri | H04Q 9/00 340/870.02 |
| 2012/0158327 A1 * | 6/2012 | Hurri | G06Q 50/06 702/62 |
| 2012/0158328 A1 * | 6/2012 | Hurri | G06Q 50/06 702/62 |
| 2012/0158329 A1 * | 6/2012 | Hurri | G06Q 50/06 702/62 |
| 2012/0221555 A1 * | 8/2012 | Byrne | G06F 16/338 707/723 |
| 2012/0221556 A1 * | 8/2012 | Byrne | G06F 16/367 707/723 |
| 2012/0221558 A1 * | 8/2012 | Byrne | G06F 17/30864 707/723 |
| 2013/0013377 A1 * | 1/2013 | Kruglick | G06Q 30/04 705/7.36 |
| 2013/0111277 A1 * | 5/2013 | Klemenz | G06F 11/3664 714/57 |

(56) References Cited

U.S. PATENT DOCUMENTS

| | | | | |
|---|---|---|---|---|
| 2013/0286852 A1* | 10/2013 | Bowler | ............... | H04L 1/00 370/242 |
| 2013/0290783 A1* | 10/2013 | Bowler | ............... | H04L 41/0681 714/25 |
| 2013/0290791 A1* | 10/2013 | Basile | ............... | H04L 41/22 714/47.1 |
| 2013/0291034 A1* | 10/2013 | Basile | ............... | H04N 21/6168 725/107 |
| 2014/0026002 A1* | 1/2014 | Haines | ............... | G06F 11/0715 714/57 |
| 2014/0267788 A1* | 9/2014 | Bowler | ............... | H04N 7/10 348/192 |
| 2014/0269869 A1* | 9/2014 | Bowler | ............... | H04L 25/03343 375/224 |
| 2014/0270095 A1* | 9/2014 | Bowler | ............... | H04M 3/30 379/22.03 |
| 2014/0278273 A1* | 9/2014 | Bowler | ............... | H04L 41/069 703/1 |
| 2014/0282189 A1* | 9/2014 | Bansal | ............... | G06F 3/04847 715/771 |
| 2014/0310605 A1* | 10/2014 | Basile | ............... | H04L 41/22 715/736 |
| 2015/0067635 A1* | 3/2015 | Chen | ............... | G06Q 10/06 717/102 |
| 2015/0143268 A1* | 5/2015 | Retlich | ............... | G05B 23/0216 715/763 |
| 2015/0186124 A1* | 7/2015 | Hoy | ............... | G06F 8/61 726/22 |
| 2016/0063282 A1* | 3/2016 | Shani | ............... | G06F 9/38 717/121 |
| 2016/0134476 A1* | 5/2016 | Kerber | ............... | H04L 67/104 709/221 |
| 2016/0148118 A1* | 5/2016 | Venkateswarulu | ............... | G06Q 10/0637 706/12 |
| 2016/0174146 A1* | 6/2016 | Wang | ............... | H04W 76/00 370/254 |
| 2016/0179598 A1* | 6/2016 | Lvin | ............... | G06F 11/079 714/48 |
| 2016/0223608 A1* | 8/2016 | Hours | ............... | G06F 30/20 |
| 2016/0261459 A1* | 9/2016 | Kamath | ............... | H04L 41/082 |
| 2016/0275202 A1* | 9/2016 | Lee | ............... | G06F 16/2365 |
| 2016/0299807 A1* | 10/2016 | Tanabe | ............... | G06F 11/327 |
| 2016/0308712 A1 | 10/2016 | Azriel et al. | | |
| 2016/0359872 A1* | 12/2016 | Yadav | ............... | H04L 43/04 |
| 2016/0371961 A1* | 12/2016 | Narang | ............... | H04W 8/005 |
| 2017/0063920 A1* | 3/2017 | Thomas | ............... | H04L 9/32 |
| 2017/0118104 A1* | 4/2017 | Li | ............... | H04L 43/0811 |
| 2017/0123885 A1* | 5/2017 | Margalit | ............... | G06F 11/0709 |
| 2017/0124667 A1* | 5/2017 | Ho | ............... | G01R 22/063 |
| 2017/0126472 A1* | 5/2017 | Margalit | ............... | G06Q 50/10 |
| 2018/0039564 A1* | 2/2018 | Zimmermann | ............... | G06F 11/327 |
| 2018/0167281 A1* | 6/2018 | Gharpure | ............... | H04L 67/36 |
| 2019/0052531 A1* | 2/2019 | Sividia | ............... | H04L 41/0853 |
| 2019/0259105 A1* | 8/2019 | Jhoney | ............... | G06F 11/0709 |

* cited by examiner

SYSTEMS AND METHOD FOR SERVICE MAPPING

CROSS REFERENCE TO RELATED APPLICATION

This application claims priority to and benefit of U.S. Patent Application No. 62/568,087, entitled "PLATFORM COMPUTING ENVIRONMENT AND FUNCTIONALITY THEREOF", filed Oct. 4, 2017, which is herein incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). These resources may be used to collect and store data at various times related to a variety of measurable properties, including network, hardware, or database performance properties measured at different times. As networks become more complex, network maintenance and management becomes a more resource intensive task.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, store, and distribute information. Graphical-user-interfaces (GUIs) may provide interactive objects for viewing and manipulation by a user that may facilitate usage of this data. As GUIs become increasingly complex, it may be more difficult to discern certain characteristics of the GUIs' interactive objects.

With this in mind, an IT system may include service mapping logic that generates an accurate, service-aware view (e.g., a "service mapping") of the system infrastructure that is frequently refreshed, keeping the view up to date. The service mapping may be constructed by discovering and mapping relationships between IT components running specific services. The service mapping logic may monitor the IT infrastructure for service-affecting changes and update the service mapping in real-time. The service mapping may provide a mix of applications and IT components that support a service and provide an understanding of how these applications and components are related.

The disclosed techniques enable a user to better maintain and manage a network of components. Specifically, the disclosed techniques enable a user to better identify problems experiences by services or sub-services within a service mapping, understand the impacts of the problems experienced, and take action to resolve the problems. Additionally, the disclosed techniques may be used to prevent users from creating dependency loops within a service mapping. Specifically, a service mapping may include a plurality of tiles, each representing an enterprise service. The tiles may be connected by lines representing connections between the services. Some of the services may be made up of one or more sub-services. Some embodiments may include multiple nested layers of services and subservices. When one of the sub-services experiences a problem, the service map that includes the parent service may display an alert (e.g., an alert banner of the tile corresponding to the service) to indicate that one of the sub-services is experiencing a problem. A user may then select the service to view a sub-service map of all the various sub-services of the parent service. Adjacent the service maps, impact trees may be displayed which indicate how services or subservices are affected by the problem. In some embodiments, one or more dependency tables may be maintained to keep track one how the various services are dependent upon one another. If a user attempts to create a dependency relationship, the system may reference to dependency tables to determine that the dependency relationship does not create a dependency loop. If the dependency relationship would create a dependency loop, the system may prevent the dependency relationship from being implemented.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

DETAILED DESCRIPTION

Figure 1:
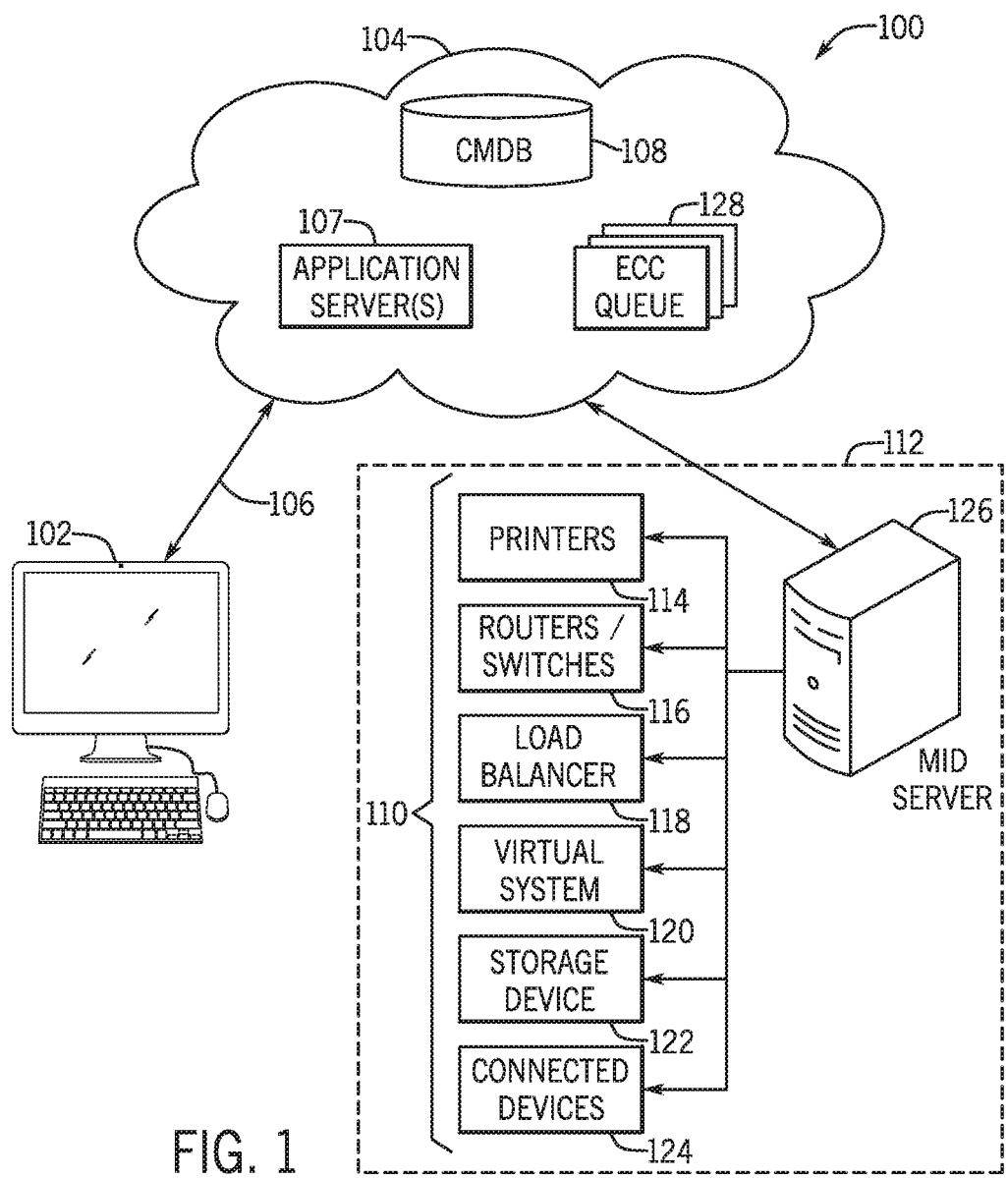
FIG. 1 is a block diagram of a distributed computing system utilizing a cloud service and a configuration management databases (CMDB), in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an electronics-driven world in which various electronic devices are interconnected within a distributed context. As more and more functions are performed by services using some form of distributed computing, the complexity of IT network management increases. As these devices are separated geospatially, managing and tracking configuration of these devices may become more difficult.

In such an interconnected but distributed context, the configuration of each of these devices may be represented by configuration items (CIs) that detail certain configurations, parameters, components, software, or settings associated with a respective device. CIs may include information related to a physical entity (e.g., hardware), a logical entity (e.g., version, instance of a database), a conceptual entity (e.g., a service or license), and the like associated with a respective device. Given the wide variety of CIs associated with various devices within this type of complex IT environment, configuration item (CI) discovery executed on a given infrastructure is used to track the CIs of the devices that are present on the connected IT environment. That is, CI discovery is the process of finding configuration items, such as hardware, software, documentation, location, and other information related to the devices connected to a given network, such as an enterprise's network. This discovery process may be performed at least partially using automated routines, e.g., an application program or probe, running on the network in question. When a CI is identified by such routines, discovery includes exploring some or all of the CI's configuration, provisioning, and current status. This explored information may be used to update one or more databases, such as a configuration management database (CMDB), accordingly.

The CMDB stores and tracks all of the discovered devices connected to the network. On computer systems, the discovery process may also identify software applications running on the discovered devices, and any connections, such as Transmission Control Protocol (TCP) connections between computer systems. Discovery may also be used to track all the relationships between computer systems, such as an application program running on one server that utilizes a database stored on another server. CI discovery may be performed at initial installation or instantiation of connections or new devices, and/or CI discovery may be scheduled to occur periodically to track additions, removals, or changes to the IT devices being managed, thereby keeping data stored on the CMDB current. Thus, using the discovery process, an up-to-date map of devices and their infrastructural relationships may be maintained.

Information technology (IT) networks may include a large number of resources, such as servers, applications, and/or other hardware devices. Each of these devices may have one or more corresponding configuration files that control how the asset functions. These configuration files may facilitate discovery of the corresponding devices.

By way of introduction, FIG. 1 is a block diagram of a system 100 that utilizes distributed computing framework, which may perform one or more of the techniques described herein. As illustrated in FIG. 1, a client 102 communicates with a platform 104, e.g., a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs capable of running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together and communicate using one or more networks. For instance, the platform 104 may be a cloud service platform that includes various computers acting as servers in datacenters at one or more geographic locations where the computers are connected together using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, the client 102 may connect to various devices with various functionalities, such as gateways, routers, load balancers, databases, application servers running application programs on one or more nodes, or other devices that may be accessed via the platform 104. For example, the client 102 may connect to an application server 107 and/or databases, such as the configuration management database (CMDB) 108, via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server (e.g., the CMDB 108).

The CMDB 108 is a series of tables containing information about all of the assets and enterprise services controlled by a client 102 and the configurations of these assets and services. The assets and services include configuration items (CIs) 110 that may be computers, other devices or hardware on a network 112 (or group of networks), software contracts and/or licenses, or enterprise services. The CIs 110 include hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models. As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and/or the like. The CMDB 108 may include an index of CIs 110, attributes (e.g., roles, characteristics of elements, etc.) associated with the CIs 110, and/or relationships between the CIs 110. Furthermore, the CMDB 108 may track which configuration files identified pertain to each CI 110.

Additional to or in place of the CMDB 108, the platform 104 may include one or more other database servers. The database servers are configured to store, manage, or otherwise provide data for delivering services to the client 102 over the communication channel 106. The database server includes one or more databases (e.g., CMDB 108) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely, such as at a client site.

In the depicted topology, access to the platform 104 is enabled via a management, instrumentation, and discovery (MID) server 126 via a communication queue 128, such as an External Communications Channel (ECC) Queue. The MID server 126 may include an application program (e.g., Java application) that runs as a service (e.g., Windows service or UNIX daemon) that facilitates communication and movement of data between the platform 104 and external applications, data sources, and/or services. The MID server 126 may be executed using a computing device (e.g., server or computer) on the network 112 that communicates with the platform 104. As such, in some embodiments, the MID server 126 may connect back to the platform 104 using a virtual private network connection that simulates the CIs 110 being connected to the platform 104 on a common physical network.

As discussed below, the MID server 126 may periodically and/or intermittently use discovery probes to determine information on devices connected to the network 112 and return the probe results back to the platform 104. Probes may have different types and functions. For example, some probes may identify devices running specific operating systems (e.g., Windows or Linux) while other exploration probes may return disk information for those devices using the operating systems. Some probes run a post-processing script to filter the data that is sent back to the platform 104.

As a non-limiting example, the probe types available for use by the MID server 126 may include a Common Information Model (CIM) probe that utilizes the CIM query language to query a CIM server using Web-Based Enterprise Management (WBEM) protocols, a Simple Network Manage Protocol (SNMP) probe to discover information about network device (e.g., routers), a Windows Management Instrumentation (WMI) Runner probe that uses the WMI to obtain information about a Windows-based device, a Powershell probe that executes Powershell scripts (e.g., Powershell V2 scripts) on a host for the MID server 126, a Secure Copy (SCP) Relay Probe that copies a file or directory contents from one host to another via the MID server 126, a Secure Shell (SSH)-based probe that executes a shell command on a target host and returns the output, a Shazzam probe that determines what devices are active using a targeted port scan, a user-defined probe class, a multi-probe that combines probe types, and/or any combination thereof.

In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The communication queue 128 may be a database table that is typically queried, updated, and inserted into by other systems. Each record in the communication queue 128 is a message from an instance in the platform 104 to a system (e.g., MID server 126) external to the platform 104 that connects to the platform 104 or a specific instance running in the platform 104 or a message to the instance from the external system. The fields of a communication queue 128 record include various data about the external system or the message in the record. For example, the record may include an agent field, a topic field, a name field, a source field, a response to field, a queue field, a state field, a created time field, a processed time field, a sequence number for the message, an error string field, a payload field, and/or other suitable fields for identifying messages and/or the systems sending/receiving the message.

Although the system 100 is described as having the application servers 107, the CMDB 108, the ECC queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may communicate with the platform 104 in addition to the MID server 126.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

Figure 2:
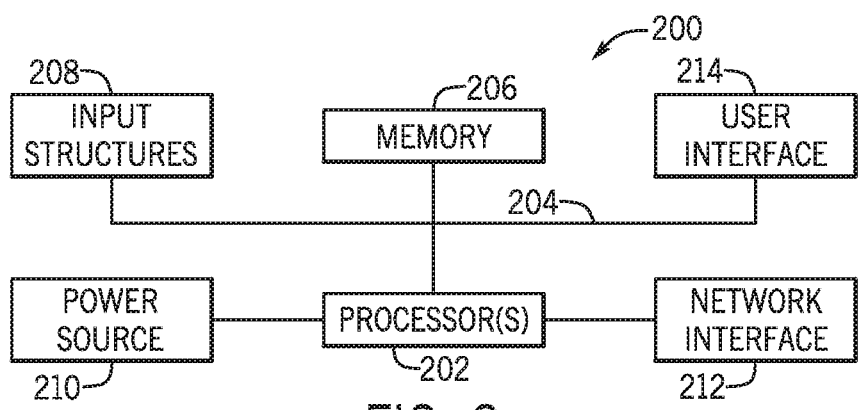
FIG. 2 is a block diagram of a generalized computing device utilized in the distributed computing system of FIG. 1, in accordance with an embodiment.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., CMDB 108), other servers in the platform 104 (e.g., server hosting the ECC queue 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors may include microprocessors, system on a chips (SoCs), or any other suitable circuitry performing functions by executing instructions stored in the memory 206 or in an otherwise accessible location. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 include suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units of the same or different types in one or more physical locations. The one or more processor 202 may access data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, haptic feedback, and the like.

Figure 3:
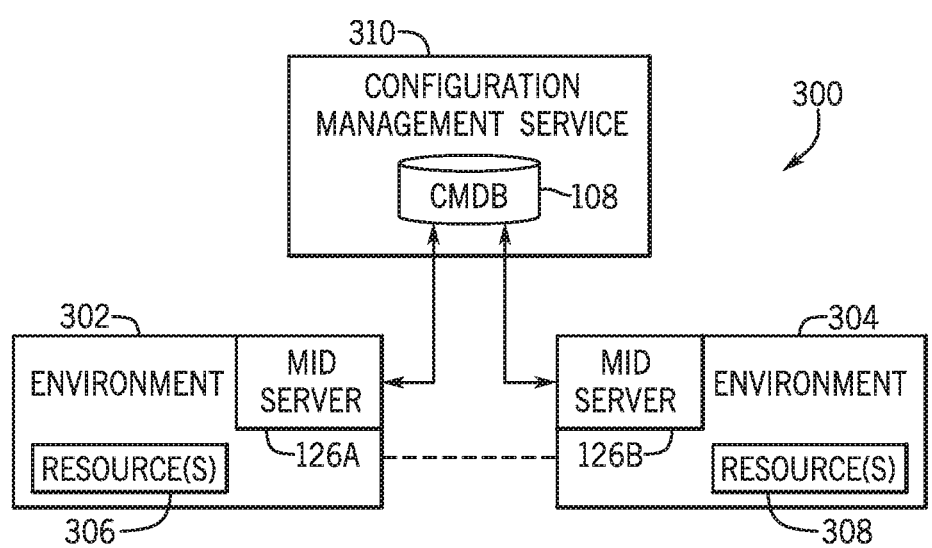
FIG. 3 is a block diagram of an electronic computing and communication system that utilizes the CMDB of FIG. 1, in accordance with an embodiment.

FIG. 3 is a block diagram of an embodiment of an electronic computing and communication system 300 for discovering and/or managing connected configuration items. The electronic computing and communication system 300 includes one or more environments such as environments 302 and 304 each including resources 306 and 308, respectively. Each environment 302, 304 may include one or more networks coupling resources together in a location-based, function-based, and/or common credentials-based grouping.

For example, the environments 302, 304 may include a customer service environment used to represent customer service infrastructure in a technical support, sales, billing, and/or other groupings. Similarly, the environments 302, 304 may include a datacenter and all devices coupled to one or more networks located at the datacenter. Additionally or alternatively, the environment 302, 304 may be distributed across multiple geographical locations. Thus, the environment 302, 304 may include any devices that are accessible by a user account including resources that may be spatially distant from each other. In some embodiments, resources 306, 308 of the environments 302, 304 may communicate with each other across environments. However, in some embodiments, aspects of various environments may be provided by different vendors without communication there between. In such embodiments, the resources of disparate environments may communicate using the platform 104 (e.g., a configuration management service 310 that is a part of a cloud service platform 104 including the CMDB 108). The resources 306 and 308 may include any suitable configuration item 110 previously discussed.

The configuration management service 310 may include one or more servers providing access to and managing the CMDB 108. The configuration management service 310 may allocate or provision resources, such as application instances in the resources 306 or 308 from a respective environment 302 or 304. Further, the configuration management service 310 may create, modify, or remove information in the CMDB 108 relating to the resources 306 or 308. Thus, the configuration management service 310 may manage a catalogue of resources in more than a single environment (even if the environments may not directly communicate with each other). Using this catalogue, the configuration management service 310 may discover new resources, provision resources, allocate resources, modify, and/or remove resources from the catalogue across a single environment or multiple environments. In some embodiments, these actions may be initiated as part of an operation executed on a client 102, may be scheduled for periodic occasions (e.g., periodic discovery), or may be a combination thereof. For example, a client 102 may receive a request, via its input structures, to query an identity of an application program interface (API) used by a resource to access a particular vendor/provider for the environment 302 that is passed to the configuration management service 310 to query the CMDB 108. As another example, the client 102 may receive a request, via its input structures, to query an identity of a user authorized to access a particular resource that is passed to the configuration management service 310.

As previously discussed, the CMDB 108 may be populated utilizing a discovery process which may be used to discover the resources 306 or 308. Moreover, as previously discussed, the discovery process may include determining the properties or attributes of the resources 306 or 308 in their respective environments 302 or 304 using a respective MID server 126A or 126B. In the illustrated embodiment, each environment 302 and 304 has its own MID server 126A and 126B. In some embodiments, a single MID server may be employed when the MID server may reach into multiple environments. For example, if the MID server is run in the platform 104 (e.g., in the configuration management service 310), a single MID server may be used to manage both environments 302 and 304. Additionally or alternatively, if the MID server 126A has access to the environment 304, the MID server 126B may be omitted.

As previously discussed, each discovered resource is identified as a configuration item 110 with a record stored in the CMDB 108 including data indicating properties, attributes, dependencies, or other information about the resource. The CMDB 108 may be encoded, for example, as a relational database management system (RDBMS); an object-oriented database (e.g. an XML database); a network model database; or a flat-file database.

Figure 4:
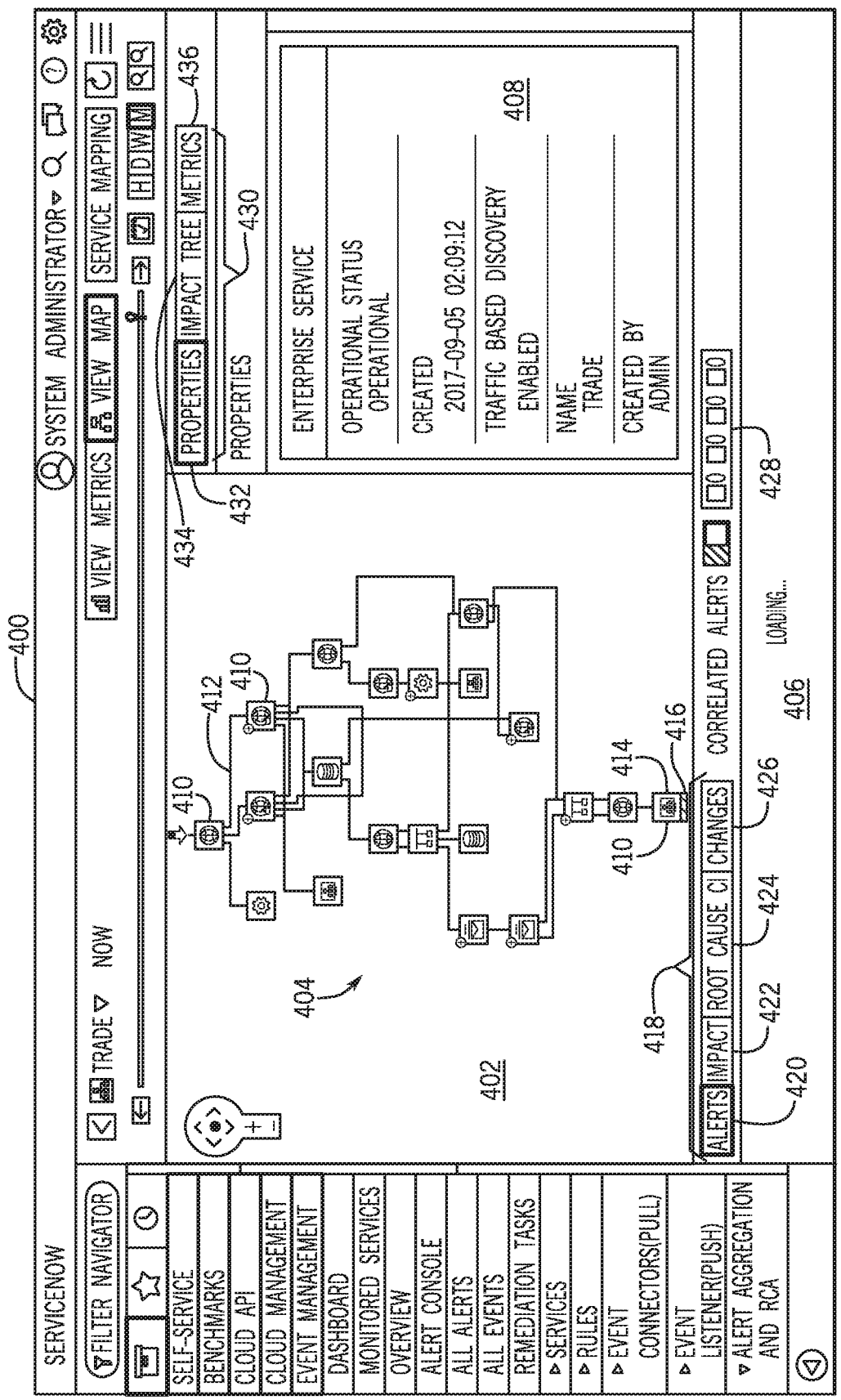
FIG. 4 is a screen shot of a service mapping screen, in accordance with an embodiment.

As may be appreciated, over time, configuration files used by the CIs 110 may change. As previously noted, in systems with multiple CIs 110 it may be difficult and/or time-consuming to examine the configuration files to determine where or when changes are made to various files. Accordingly, a discovery process may be run periodically to discover new CIs 110 or changes to existing CIs. A service map (e.g., a visual representation of CIs 110, services, and/or operations and the relationships between the various CIs 110, services, and/or operations) may be generated for display to a user. As the discovery process is run periodically, the service map may be updated to reflect changes recognized during the discovery process. FIG. 4 is a screen shot of an embodiment of a service mapping screen 400. As shown, the service mapping screen 400 includes a service map window 402 for displaying a service map 404, as well as a bottom window 406 and a top window 408. As is described in more detail below, a user may control what is displayed in the bottom window 406 and the side window 408 by selecting buttons within the service mapping screen 400. As shown, the service map 404 includes a plurality of tiles 410 connected by one or more lines 412. Each tile 410 may be representative of a CI, a service, an operation, etc. In some embodiments, a service represented by a single tile may include multiple sub-services or supporting services. As described in more detail below, a service map of the sub-services may be displayed when the tile 410 corresponding parent service is selected from the service map 404. Previously, when a sub-service was experiencing a problem (e.g., returning an error, having trouble connecting, or some other event), a user would only be able to ascertain that the sub-service was experiencing a problem by selecting the parent service, viewing the service map for the sub-services, and noticing an alert corresponding to the sub-service. Accordingly, problems experienced by sub-services frequently go unnoticed and may take a significant investment of time, especially for complex service maps 404, with multiple levels of nested services, to discover.

As shown in the service map 404 of FIG. 4, a tile 414 is representative of a parent service with a sub-service that is experiencing a problem. An alert banner 416 across the bottom of the parent tile 414 indicates that one of the parent service's sub-services is experiencing a problem. In the illustrated embodiment, the alert banner 416 is a colored stripe across the bottom of the tile 414. However, it should be understood that alerts may be communicated in other ways (e.g., flashing colors, icons displayed over or next to the tile 414, watermarked or dimmed tiles 141, shaded tiles 414, etc.). Further, different display options may be used to communicate different statuses or severities of errors. For example, the alert banner 416 may be green to indicate that an alert has been resolved, blue may indicate a warning, yellow may indicate a minor problem, orange may indicate a major problem, and red may indicate a critical problem.

The bottom window 406 displays various information based upon which button is selected from row 418. For example, when an alerts button 420 is selected, the bottom window 406 is populated with a listing of alerts experienced by any of the services of the service map 404 (e.g., represented by the tiles 410, 416), or their sub-services. When an impact button 422 is selected, the bottom window 406 may display how a selected service impacts other related services and/or how other related services impact the selected service. When a root cause CI button 424 is selected, the bottom window may display the service or services that are responsible for an error experienced by the selected service. When a changes button 426 is selected, the bottom window 406 may display recent changes to a selected service and/or changes to relationships between the selected CI and other related CIs. Adjacent the row of buttons 418 is an alert indicator 428. The alert indicator may include a graphic (e.g., a color swatch or icon) for each of the various alert levels or categories. Adjacent each graphic may be a number indicative of the number of errors of the respective level or category.

Similarly, a row of tabs 430 may allow a user to control what is displayed in the side window 408. For example, selecting a properties tab 432 may display the properties of the selected service(s) (e.g., CIs, operations, etc.) in the side window 408. Selecting an impact tree tab 434 may display impact relationships between multiple services and/or sub-services (e.g., which services have an impact on the selected service). As is described in more detail below, the impact tree tab 434 may also be used to identify errors in sub-services of a selected service, services upon which a selected service is dependent, services that depend upon a selected service, etc. Selecting a metrics tab 436 may display one or metrics of a selected service or group of services.

Figure 5:
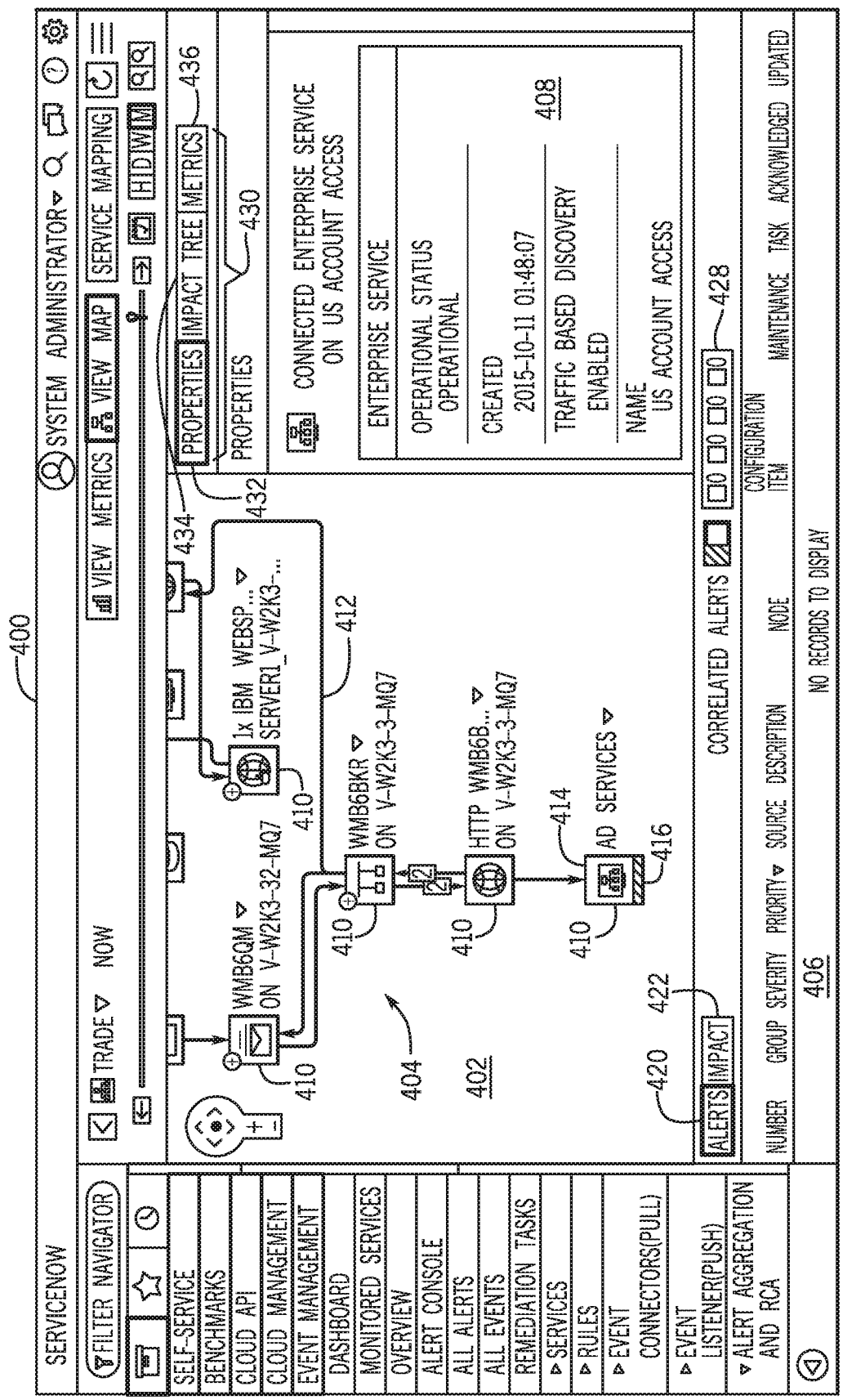
FIG. 5 is a screen shot of the service mapping screen of FIG. 4, with a service map window zoomed in on a bottom of a service map, in accordance with an embodiment.

FIG. 5 is a screen shot of an embodiment of the service mapping screen 400 of FIG. 4, with the service map window 402 zoomed in on the bottom of the service map 404, which includes the tile 414. As shown, the tile 414 includes the alert banner 416, indicating that the service (e.g., "AD Services") or one of its sub-services is experiencing a problem. As such, rather than clicking through various nested services and sub-services to determine whether any of the sub-services of the parent services of a service map 404 are experiencing a problem, the alert banner 416 may quickly and easily communicate to the user that the AD Services service represented by the tile 414, or one of its sub-services, is experiencing a problem. When the tile 414 corresponding to AD Services is selected (e.g., via mouse click), the service map window 402 may update to show the various sub-services of the AD Services service.

Figure 6:
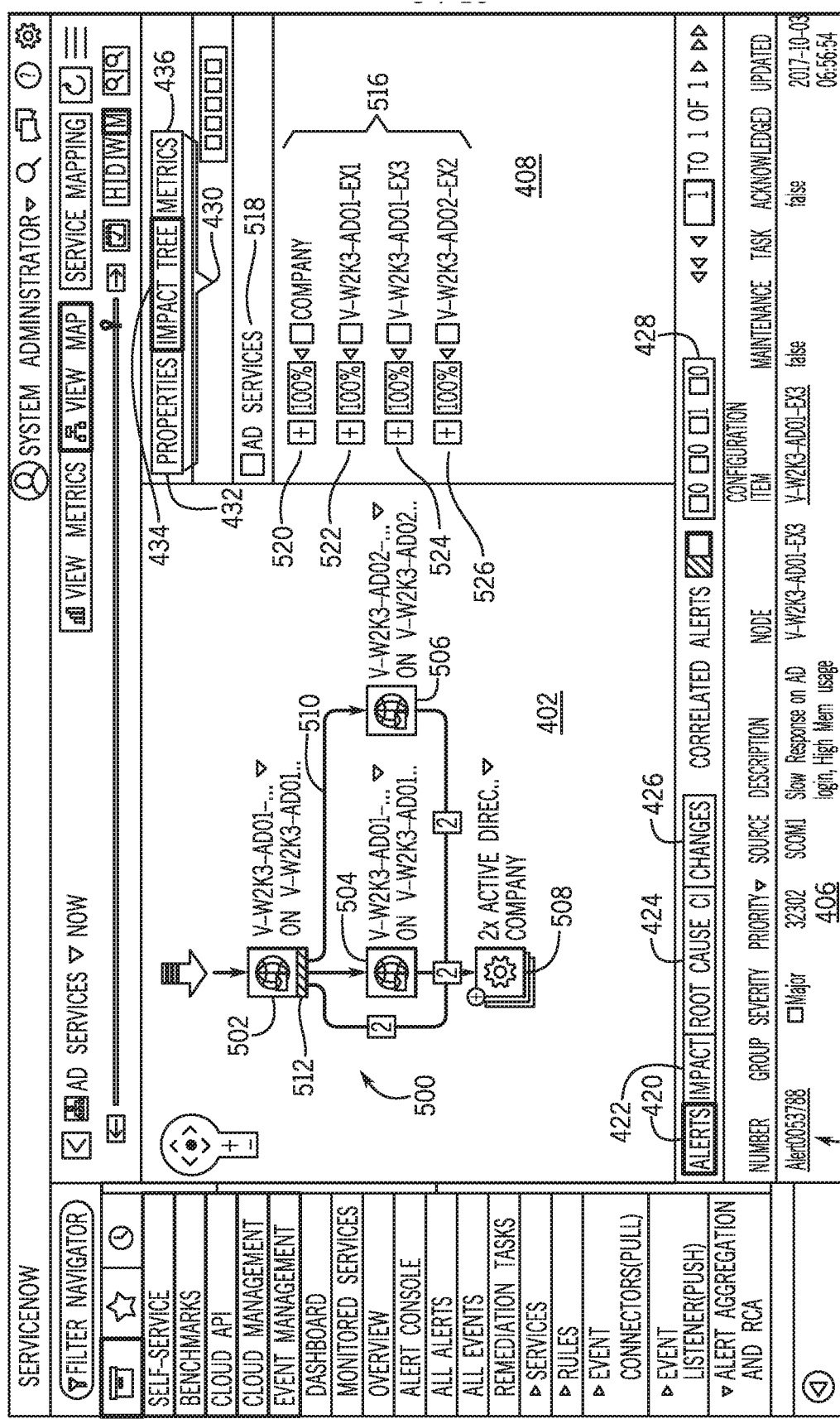
FIG. 6 is a screen shot of the service mapping screen of FIG. 4 displaying a sub-service map illustrating sub-services of an AD Services service and relationships between its sub-services, in accordance with an embodiment.

FIG. 6 is a screen shot of an embodiment of the service mapping screen 400 displaying a sub-service map 500 illustrating the sub-services of the AD Services service and the relationships between its CIs within the service and/or sub-services of the service (e.g., represented by the tile 414). In the illustrated embodiment, the sub-service map 500 includes tiles 502, 504, 506, 508 representative of the sub-services of the selected service. The tiles 502, 504, 506, 508 are connected by multiple lines 510, which represent various relationships between the sub-services. As previously described, with regard to FIG. 5, the tile corresponding to the selected AD Services service included an alert banner indicating that one of its sub-services was experiencing a problem. As shown in FIG. 6, tile 502 includes an alert banner 512, indicating that it is the sub-service experiencing a problem. It should be understood however, that though a single sub-service in the sub-service map 500 of FIG. 6 is experiencing a problem, in some embodiments, multiple sub-services may be experiencing problems simultaneously.

In addition to the tile 502 corresponding to the affected sub-service having the alert banner 512, the problem experienced by the sub-service is reflected in the bottom window 406 and the side window 408. For example, when the alerts button 420 is selected, the bottom window includes an alert listing 514 that includes various information (e.g., alert number, group, severity, priority, source, description, node, configuration item, maintenance, task, acknowledged, dated date/time, etc.) about the problem encountered by the sub-service. In the illustrated embodiment, the problem encountered by the sub-service is determined to be "major". Accordingly, the alert indicator 428 has been updated to reflect one major problem by displaying a numeral 1 next to the swatch corresponding to the major alert category.

Further, the problem is reflected in the side window 408 via an impact tree 516. As shown, when the impact tree button 434 is selected, the impact tree 516 is displayed within the side window 408. As shown, a first icon 518 may represent the selected parent service (e.g., AD Services). Various sub-icons 520, 522, 524, 526 may represent the sub-services. The colors of the icons 518, 520, 522, 524, 526 may correspond to the alert categories or levels shown in the alert indicator 428. Accordingly, the status of each of the sub-services may be quickly and easily communicated to the user via the impact tree 516. Further, the nested groups of the impact tree may communicate to the user how various services and sub-services are related to one another and how services affect the selected service. Once the service or sub-service experiencing the problem have been identified, the user may take action to correct the problem.

Figure 7:
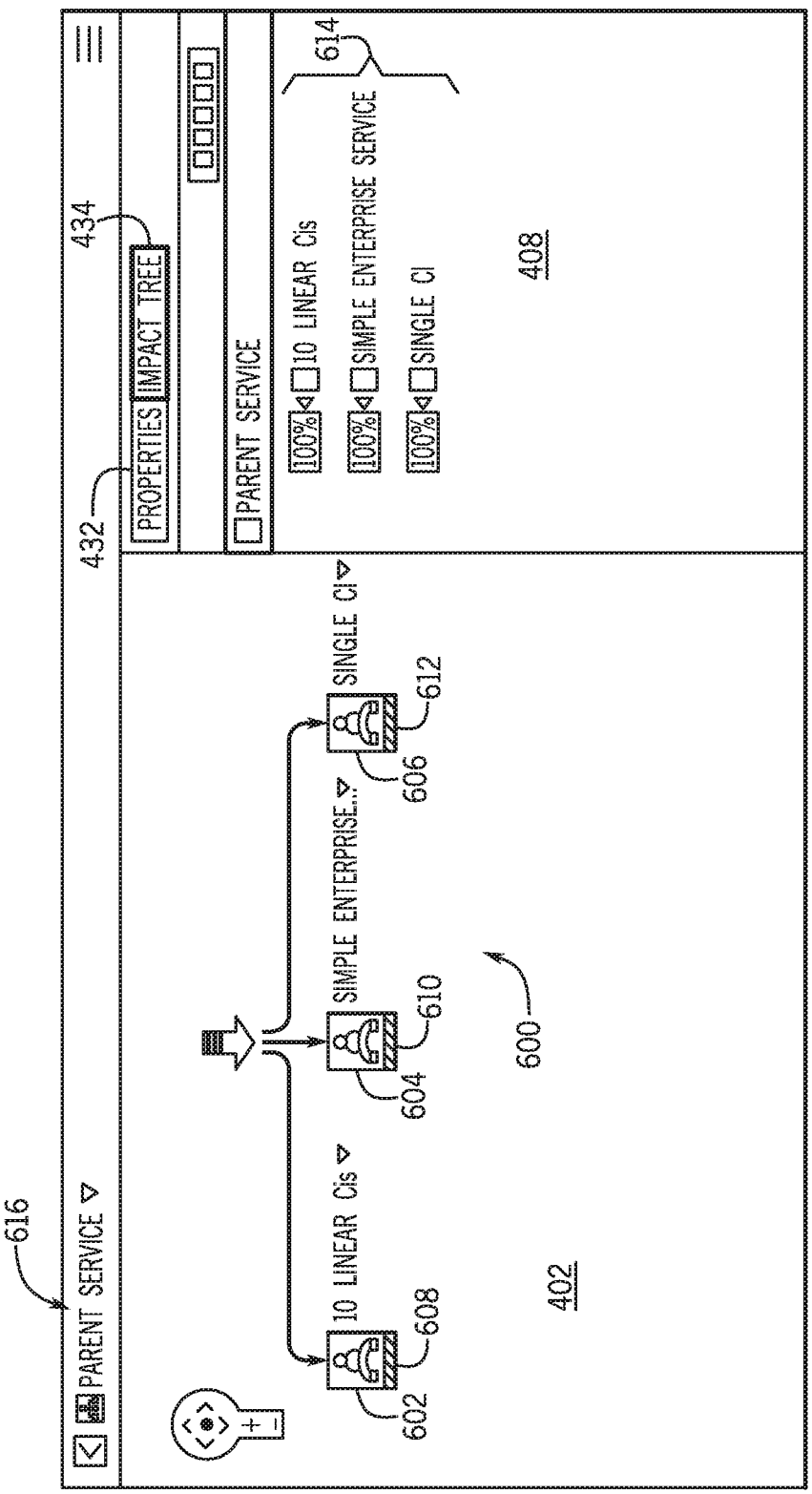
FIG. 7 is a sub-service map for sub-services of a parent service, in accordance with an embodiment.

FIGS. 7-10 illustrate an additional example of navigating nested service maps for nested serviced and sub-services. For example, FIG. 7 is a sub-service map 600 for the sub-services of a parent service (e.g., "parent service"). The sub-services include, for example, 10 linear CIs, represented by tile 602, simple enterprise service, represented by tile 604, and single CI, represented by tile 606. In the illustrated embodiment, each sub-service is experiencing a problem, or has its own sub-service that is experiencing a problem. As such, each tile 602, 604, 606, includes a respective alert banner 608, 610, 612 indicating a problem. As previously discussed, each alert banner 608, 610, 612 may include a characteristic (e.g., color) that communicates the category or severity of the encountered problem. The various sub-services, their relationships to one another, and the problems encountered by each, if any, are also communicated by the impact tree 614. When navigating nested service maps, the name of the parent service 616 (e.g., parent service), may be displayed above the service map window 402.

Figure 8:
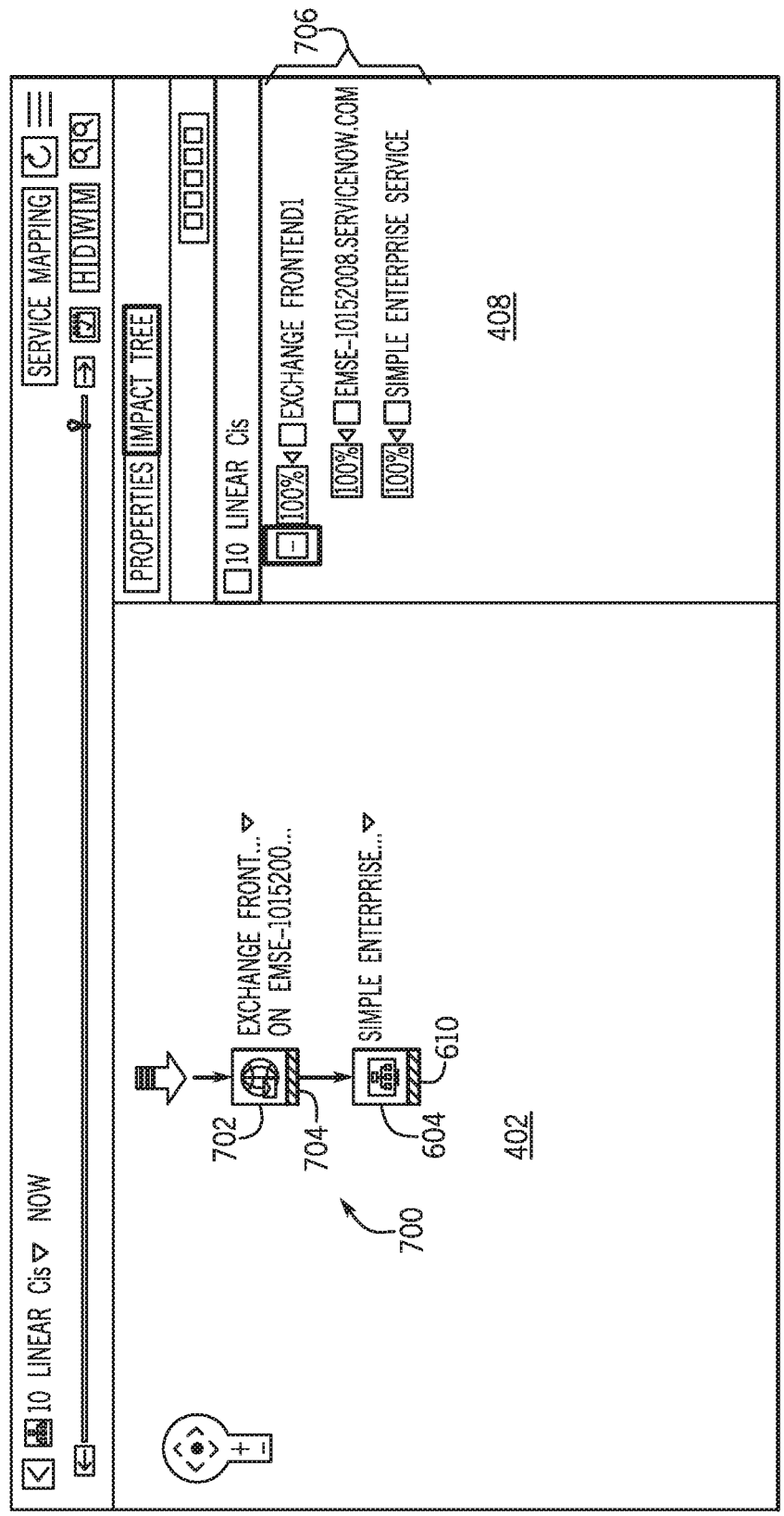
FIG. 8 is a sub-service map for sub-services of a 10 linear CIs service of FIG. 7 that may be displayed when a tile corresponding to the 10 linear CIs service of FIG. 7 is selected, in accordance with an embodiment.

If the user selects any of the tiles 602, 604, 606 corresponding to the sub-services, a new sub-service map may be displayed. For example, FIG. 8 is a sub-service map 700 for the sub-services of the 10 linear CIs service of FIG. 7 that may be displayed when the tile 602 corresponding to the 10 linear CIs service of FIG. 7 is selected. As shown, the sub-services of the 10 linear CIs include an emse-10152008.servicenow service, indicated by tile 702, and the simple enterprise service, indicated by tile 604, which was also shown in the sub-service map of FIG. 7 as being a sub-service of the parent service. As is described in more detail below, services may be configured to depend on one another, such that a given service may appear in both a service map and in one or more a sub-service maps for a given network. If not prevented from doing so, a user may accidentally create a loop of dependency. That is, the user may make service A dependent on service B, and then make service B dependent on service A. If either service encounters a problem, the system will enter a loop of problems and the system may not operate as desired. Accordingly, dependencies between services and sub-services may be stored in a table. As the user is configuring one or more services or sub-services, the system may reference the table to make sure the user does not create dependency loops. If, for example, the user attempts to configure services in a way that would create a dependency loop, the system may recognize as much and prevent the user from configuring the services as such.

As illustrated, tiles 604, 702 for both sub-services include alert banners 610, 704, indicating that each service is experiencing a problem. As previously described, the problems encountered by the sub-services are also reflected in an impact tree 706 displayed within the side window 408.

Figure 9:
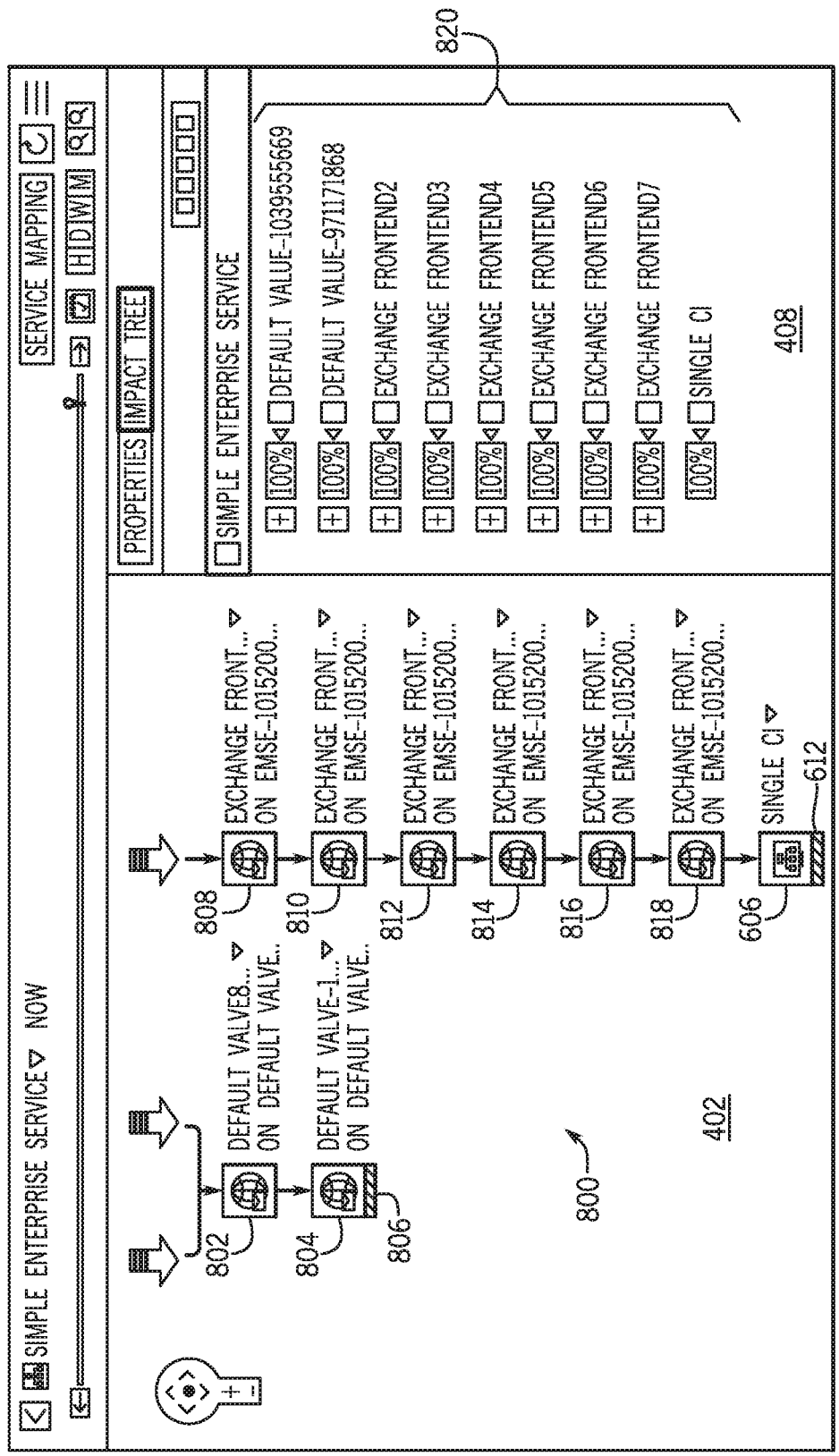
FIG. 9 is a sub-service map for sub-services of a simple enterprise service of FIG. 7, in accordance with an embodiment.

FIG. 9 is a sub-service map 800 for the sub-services of the simple enterprise service (represented by tile 604) of FIG. 7. As shown, the simple enterprise service is dependent upon two chains of sub-services. The first chain includes a first tile 802 corresponding to a service called "default value 971171868" and a second tile 804 corresponding to a service called "default value 1039555669". The "default value 1039555669" service is experiencing a problem, so the second tile 804 includes an alert banner 806. The second chain includes tiles 808, 810, 812, 814, 816, 818, 606, which represent various sub-services. As shown, the second chain of sub-services includes the single CI service shown in FIG. 7 and represented by tile 606. Because the single CI service is encountering a problem, the tile 606 includes an alert banner 612. As with previously described figures, the side window 408 displays an impact tree 820 that lists the various services and sub-services. The impact tree includes 820 status icons that display the status of each service or sub-service. Thus, if a service or sub-service is encountering a problem, the status is reflected in both the sub-service map 800 and the impact tree 820.

Figure 10:
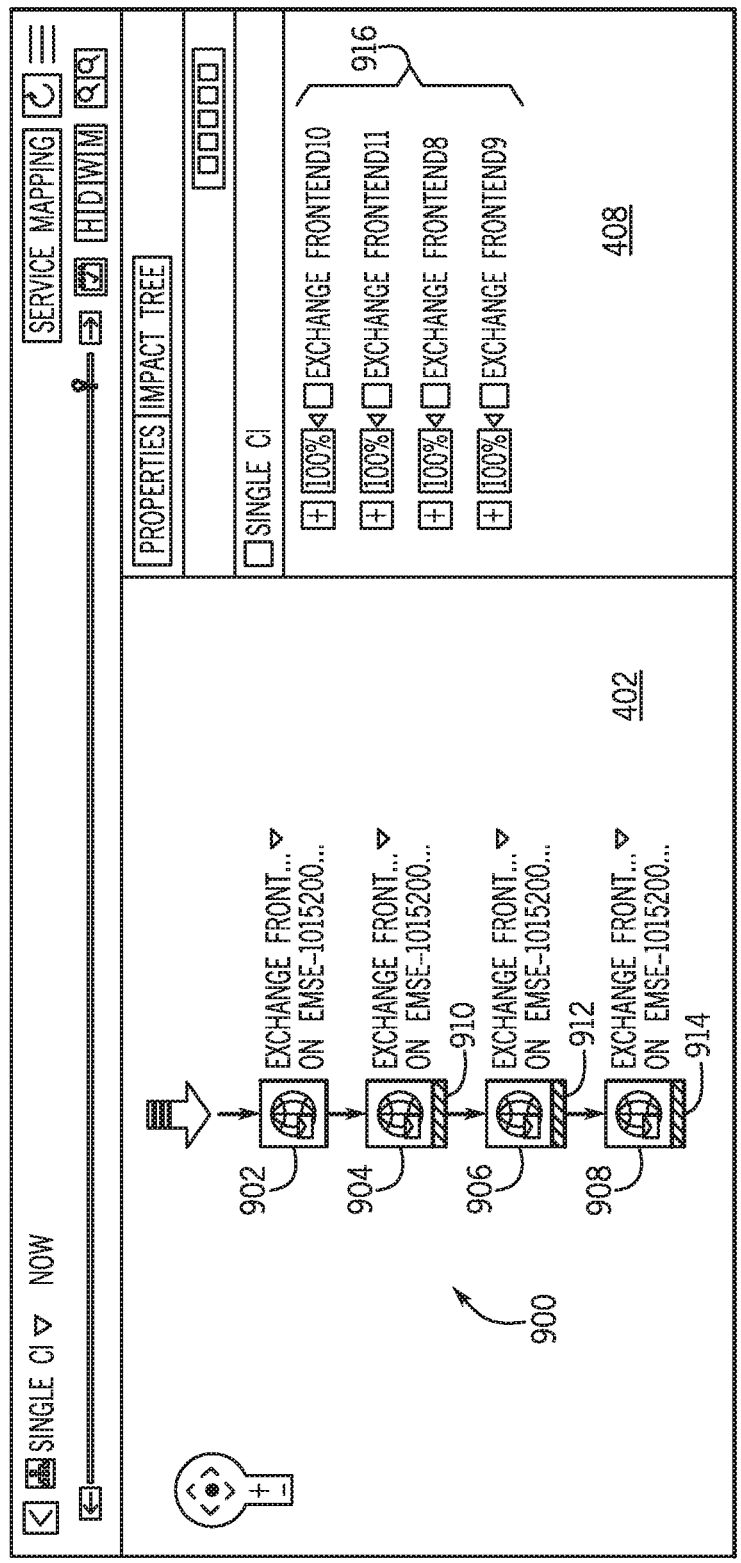
FIG. 10 is a sub-service map for sub-services of a single CI service of FIG. 7, in accordance with an embodiment.

FIG. 10 is a sub-service map 900 for the sub-services of the single CI service (represented by tile 612) of FIG. 7. As shown, the single CI service is dependent upon various sub-services represented by tiles 902, 904, 906, 908. Because the services represented by tiles 904, 906, 908, are encountering problems, the tiles 904, 906, 908 include respective alert banners 910, 912, 914. As with previously described figures, the side window 408 displays an impact tree 916 that lists the various services and sub-services. The impact tree 916 includes status icons that display the status of each service or sub-service. Thus, if a service or sub-service is encountering a problem, the status is reflected in both the sub-service map 900 and the impact tree 916.

Figure 11:
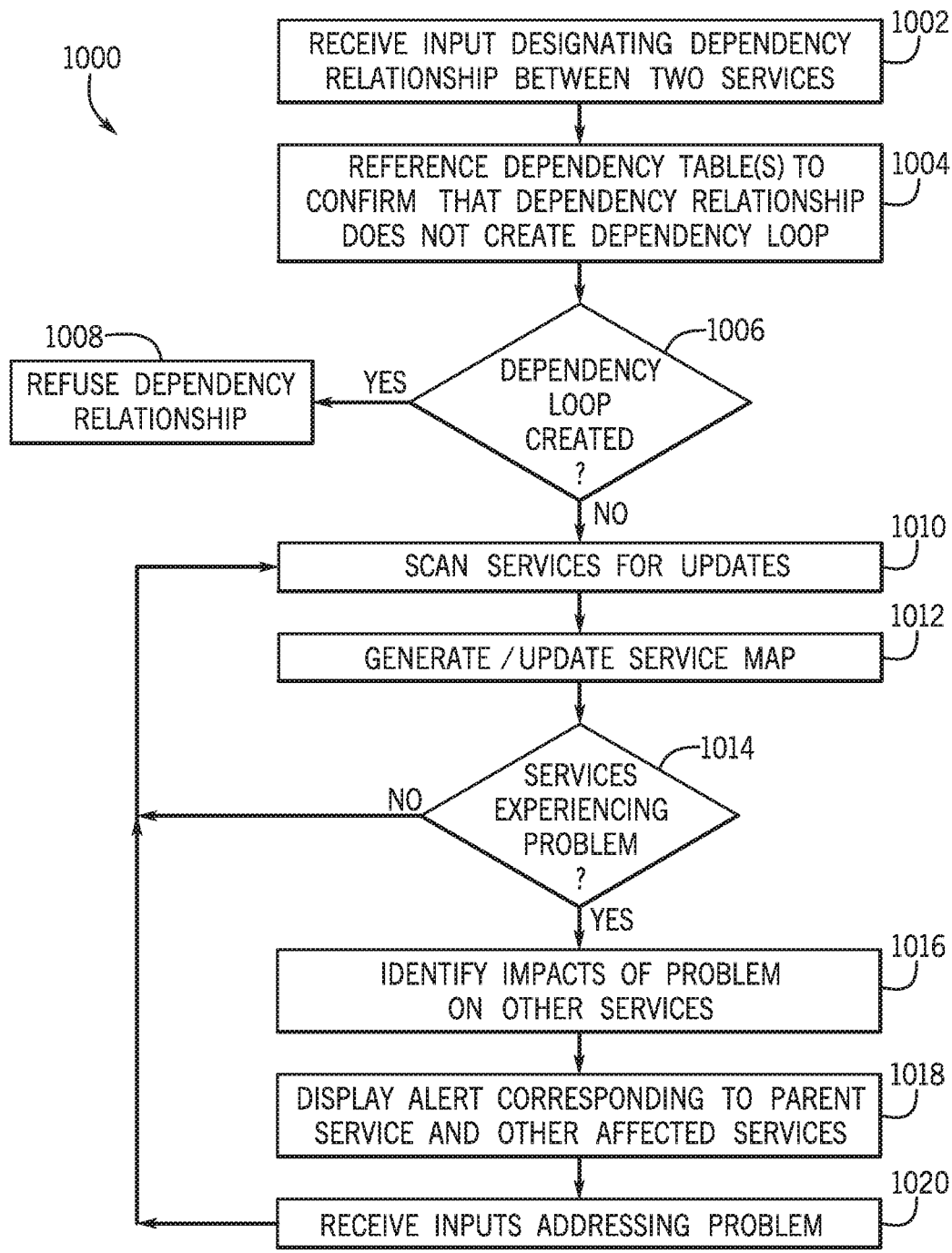
FIG. 11 is a flow chart of a process for preventing dependency loops and identifying impacts of problems encountered by services in service mapping, in accordance with an embodiment.

FIG. 11 is a flow chart of a process for preventing dependency loops and identifying the impacts of problems encountered by services in service mapping. At block 1002, the process 1000 receives an input designating a dependency relationship between two services (e.g., CIs, operations, services, etc.). the services may be services discovered during a discovery process, services that have been manually added, or both. The dependency relationship may be a parent/child relationship, a service/sub-service relationship, or some other relationship. Further, the dependency may be part of levels of dependency such that the service map of the network includes multiple nested levels of services, such that one or more services may be dependent on one or more other services on a different (e.g., higher or lower) level.

The dependency of the various services may be logged in one or more dependency tables. For example, one or more dependency tables may be maintained that track what services a specified service depends upon, and/or one or more services that depend upon the selected service. In block 1004 the one or more dependency tables may be referenced to determine whether or not the new dependency relationship received in block 1002 creates a dependency loop. That is, if a parent service is dependent upon the child service and a user attempts to connect the child service such that the child service is dependent upon the parent services, allowing the user to create such a relationship would create a dependency loop. For example, if service A is dependent upon service B, and a user tried to connect service A to service B such that service B is dependent upon service A, a dependency loop would be created. For the sake of simplicity, this example includes examples of direct dependency, however, dependency loops may also include indirect dependency relationships that span multiple levels of nested relationships. In decision 1006, the process determines whether the new relationship would create a dependency loop. If a dependency loop would be created, the process moves to block 1008 and refuses to create the proposed dependency relationship in the dependency tree. In some embodiments, a refused dependency may still be displayed in the service map. If a dependency loop would not be created, the process updates the dependency tables to reflect the new dependency relationship and scans the services for updates (block 1010).

At block 1012, the process 1000 generates the service map or updates the existing service map to reflect any updates detected in block 1010. At decision 1014, the process 1000 determines whether any of the services or sub-services are experiencing problems. If none of the services or sub-services are experiencing problems, the process 1000 returns to block 1010 and scans the services for updates. If the services or sub-services are experiencing a problem, the process proceeds to block 1016 and identifies the impact on other related services. In some embodiments, the dependency tables, one or more impact tables, or other tables may be maintained and referenced to keep track of how problems or errors encountered by one or more services may impact other services on the network. For example, when a service encounters a problem the dependency tables, the impact tables, or other tables may be referenced to perform an impact calculation (e.g., the severity of the impact of the problem on other related services). At block 1018, the process 1000 may update the service map to display an alert corresponding to the parent service of the service encountering the problem, or any other affected services. As previously discussed, the alert may include colored or textured banners or stripes on the tiles corresponding to the affected services, flashing colors, icons displayed over or next to the tiles, watermarked or dimmed tiles, shaded tiles, etc. Further, the alerts may include an indication of the severity of the problem encountered via colors, textures, size of the alert, etc. In block 1020, the process 1000 may receive inputs addressing the problem. For example, the user may select the affected services in the service map to identify the service or services encountering the problem and then take action (e.g., adjust settings, reset service, etc.) to resolve the problem. In some embodiments, the system may include a diagnostic and/or error resolution tool (e.g., Event Management tool) that may help the user to identify the service encountering the problem and/or resolve the problem. The process 1000 may then return to block 1010 and scan the services for updates.

The disclosed techniques enable a user to better identify problems experiences by services or sub-services within a service mapping, understand the impacts of the problems experienced, and take action to resolve the problems. Additionally, the disclosed techniques may be used to prevent users from creating dependency loops within a service mapping. Specifically, a service mapping may include a plurality of tiles, each representing an enterprise service. The tiles may be connected by lines representing connections between the services. Some of the services may be made up of one or more sub-services. Some embodiments may include multiple nested layers of services and subservices. When one of the sub-services experiences a problem, service map that includes the parent service may display an alert (e.g., an alert banner of the tile corresponding to the service) to indicate that one of the sub-services is experiencing a problem. A user may then select the service to view a sub-service map of all the various sub-services of the parent service. Adjacent the service maps, impact trees may be displayed which indicate how services or subservices are affected by the problem. In some embodiments, one or more dependency tables may be maintained to keep track one how the various services are dependent upon one another. If a user attempts to create a dependency relationship, the system may reference to dependency tables to determine that the dependency relationship does not create a dependency loop. If the dependency relationship would create a dependency loop, the system may prevent the dependency relationship from being implemented.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . . " or "step for [perform]ing [a function]. . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a non-transitory memory; and
one or more hardware processors configured to read instructions from the non-transitory memory to perform operations comprising:
generating a graphical user interface (GUI) comprising:
a first window comprising a service mapping comprising one or more tiles, wherein each of the one or more tiles corresponds to one or more services in an enterprise network and one or more lines extending between the one or more tiles, wherein the one or more lines correspond to connections between the one or more services, wherein a first tile of the one or more tiles corresponds to a first service comprising a plurality of sub-services; and a second window comprising an expandable impact tree illustrating how the one or more services of the enterprise network relate to one another and how the one or more services affect one another;
receiving a first input designating a first dependency relationship between the first service and a first sub-service of the plurality of sub-services;
logging the first dependency relationship in a dependency table;
receiving a second input designating a second dependency relationship between the first service and a second sub-service of the plurality of sub-services;
referencing the dependency table to determine whether implementing the second dependency relationship creates a dependency loop based on the first dependency relationship;
in response to determining that implementing the second dependency relationship does create a dependency loop:
refusing to create the second dependency relationship in the dependency table; and
updating the service mapping of the GUI to display the refused second dependency relationship;
in response to determining that implementing the second dependency relationship does not create a dependency loop:
updating the dependency table to include the second dependency relationship; and
updating the service mapping of the GUI to reflect the second dependency relationship;
updating the service mapping to display an alert on the first tile of the GUI, corresponding to the first service, when one or more of the plurality of sub-services encounters an error; and
updating the expandable impact tree to indicate how the one or more services and one or more of the plurality of sub-services are impacted by the error.

2. The system of claim 1, wherein the operations comprise determining that the first service or one or more of the plurality of sub-services is encountering the error.

3. The system of claim 1, wherein the operations comprise identifying at least one of the one or more services impacted by the error.

4. The system of claim 1, wherein the operations comprise identifying one or more of the plurality of sub-services impacted by the error.

5. The system of claim 1, wherein the operations comprise displaying, in response to a selection of the first service, a sub-service mapping illustrating a plurality of sub-tiles, wherein each of the plurality of sub-tiles corresponds to one of the plurality of sub-services of the first service.

6. The system of claim 1, the operations comprising: in response to determining that implementing the second dependency relationship does create a dependency loop, indicating that the second dependency relationship will not be created.

7. The system of claim 6, the operations comprising:
receiving an adjustment command; and
updating the service mapping to display the second dependency relationship based on the adjustment command.

8. The system of claim 1, wherein the first input designates a dependency relationship between the first service and the first sub-service, such that the first dependency relationship is part of multiple levels of nested relationships.

9. A system, comprising:
a non-transitory memory; and one or more hardware processors configured to read instructions from the non-transitory memory to perform operations comprising:
  generating a graphical user interface (GUI) comprising:
    a first window comprising a service mapping illustrating one or more tiles, wherein each of the one or more tiles corresponds to one or more services in an enterprise network and one or more lines extending between the one or more tiles, wherein the one or more lines correspond to connections between the one or more services, wherein a first tile of the one or more tiles corresponds to a first service comprising a plurality of sub-services; and
    a second window comprising an expandable impact tree illustrating how the one or more services of the enterprise network relate to one another and how the one or more services affect one another;
  receiving a first input designating a first dependency relationship between the first service and a first sub-service of the plurality of sub-services;
  logging the first dependency relationship in a dependency table;
  receiving a second input designating a second dependency relationship between the first service and a second sub-service of the plurality of sub-services;
  referencing the dependency table to determine whether implementing the second dependency relationship creates a dependency loop based on the first dependency relationship;
  in response to determining that implementing the second dependency relationship does create a dependency loop:
    refusing to create the second dependency relationship in the dependency table; and
    updating the service mapping of the GUI to display the refused second dependency relationship;
  in response to determining that implementing the second dependency relationship does not create a dependency loop:
    updating the dependency table to include the second dependency relationship; and
    updating the service mapping of the GUI to reflect the second dependency relationship;
  determining whether the first service or any of the plurality of sub-services is experiencing a problem; and
  in response to determining that the first service or at least one of the plurality of sub-services is experiencing the problem:
    identifying at least one impacted service represented by the one or more tiles of the service mapping;
    updating the service mapping to display an alert on at least one of the one or more tiles corresponding to the at least one impacted service; and
    updating the expandable impact tree to indicate how the one or more services and the plurality of sub-services are impacted by the problem.

10. The system of claim 9, wherein the operations comprise displaying, in response to a selection of the first service, a sub-service mapping illustrating a plurality of sub-tiles, wherein each of the plurality of sub-tiles corresponds to one of the plurality of sub-services of the first service.

11. The system of claim 9, wherein the alert is indicative of a severity of the problem.

12. The system of claim 9, wherein the operations comprise scanning the one or more services and the plurality of sub-services for updates.

13. The system of claim 9, wherein the operations comprise receiving one or more inputs to resolve the problem.

14. The system of claim 9, the operations comprising:
  in response to determining that implementing the second dependency relationship does create a dependency loop, indicating that the second dependency relationship will not be created;
  receiving an adjustment command; and
  updating the service mapping to display the second dependency relationship based on the adjustment command.

15. A method, comprising:
  generating a graphical user interface (GUI) comprising:
    a first window comprising a service mapping illustrating one or more tiles, wherein each of the one or more tiles corresponds to one or more services in an enterprise network and one or more lines extending between the one or more tiles, wherein the one or more lines correspond to connections between the one or more services, wherein a first tile of the one or more tiles corresponds to a first service comprising a plurality of sub-services;
    a second window comprising an expandable impact tree illustrating how the one or more services of the enterprise network relate to one another and how the one or more services affect one another;
  receiving a first input designating a first dependency relationship between the first service and a first sub-service of the one or more sub-services;
  logging the first dependency relationship in a dependency table;
  receiving a second input designating a second dependency relationship between the first service and a second sub-service of the sub-services;
  referencing the dependency table to determine whether implementing the second dependency relationship creates a dependency loop based on the first dependency relationship;
  in response to determining that implementing the second dependency relationship does create a dependency loop:
    refusing to create the second dependency relationship in the dependency table; and
    updating the service mapping of the GUI to display the refused second dependency relationship;
  in response to determining that implementing the second dependency relationship does not create a dependency loop:
    updating the dependency table to include the second dependency relationship; and
    updating the service mapping of the GUI to reflect the second dependency relationship;
  determining whether the first service or any of the plurality of sub-services is experiencing a problem;
  updating the service mapping to display an alert on the first tile of the GUI, corresponding to the first service, to represent the problem; and
  updating the expandable impact tree to indicate how the one or more services and one or more of the plurality of sub-services are impacted by the problem.

16. The method of claim 15, comprising displaying, in response to a selection of the first service, a sub-service mapping illustrating a plurality of sub-tiles, wherein each of the plurality of sub-tiles corresponds to one of the one or more sub-services of the first service.

17. The method of claim 15, comprising determining an impact of the problem on at least one of the one or more services and one or more of the plurality of sub-services.

18. The method of claim 15, wherein the alert is indicative of a severity of the problem.

19. The method of claim 15, the method comprising:
    in response to determining that implementing the second dependency relationship does create a dependency loop, indicating that the second dependency relationship will not be created;
    receiving an adjustment command; and
    updating the service mapping to display the second dependency relationship based on the adjustment command.

* * * * *